US011842747B2

(12) United States Patent
Aronowitz

(10) Patent No.: US 11,842,747 B2
(45) Date of Patent: Dec. 12, 2023

(54) CALCULATING NUMBERS OF CLUSTERS IN DATA SETS USING EIGEN RESPONSE ANALYSIS

(71) Applicant: International Business Machines Corporation, Armonk, NY (US)

(72) Inventor: Hagai Aronowitz, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 17/508,428

(22) Filed: Oct. 22, 2021

(65) Prior Publication Data

US 2023/0130136 A1    Apr. 27, 2023

(51) Int. Cl.
*G10L 25/18* (2013.01)
*G10L 15/16* (2006.01)
*G06V 10/75* (2022.01)
*G06F 18/232* (2023.01)

(52) U.S. Cl.
CPC ............ *G10L 25/18* (2013.01); *G06F 18/232* (2023.01); *G06V 10/76* (2022.01); *G10L 15/16* (2013.01)

(58) Field of Classification Search
None
See application file for complete search history.

(56) References Cited

U.S. PATENT DOCUMENTS 9,424,337 B2    8/2016    Hall et al.
2014/0029757 A1    1/2014    Aronowitz et al.

FOREIGN PATENT DOCUMENTS

WO    2020199013 A1    10/2020
WO    2020221059 A1    11/2020

OTHER PUBLICATIONS

Shum et al. "On the use of spectral and iterative methods for speaker diarization", Proc. Interspeech 2012, 482-485, doi: 10.21437/Interspeech.2012-163 (Year: 2012).*
Law et al. "Deep spectral clustering learning", Proceedings of the 34th International Conference on Machine Learning, PMLR, 70: 1985-1994, 2017 (Year: 2017).*
Aronowitz et al., "New advances in speaker diarization", IBM Research Blog, Oct. 2, 20208, 5 pages.
Mell et al., "The NIST Definition of Cloud Computing", National Institute of Standards and Technology, U.S. Department of Commerce, Special Publication 800-145, 7 pages.
Ning et al., "A Spectral Clustering Approach to Speaker Diarization", Ninth International Conference on Spoken Language Processing, Jan. 2006, 4 pages.
Ogino et al., "Spectral Clustering with Automatic Cluster-Number Identification via Finding Sparse Eigenvectors", 26th European Signal Processing Conference (EUSIPCO), Sep. 2018, 5 pages.
Sholokhov et al., "Bayesian Analysis of Similarity Matrices for Speaker Diarization", IEEE International Conference on Acoustics, Speech and Signal Processing (ICASSP), May 2014, 5 pages.

* cited by examiner

*Primary Examiner* — Pierre Louis Desir
*Assistant Examiner* — Nicole A K Schmieder
(74) *Attorney, Agent, or Firm* — Barry D. Blount

(57) ABSTRACT

An example system includes a processor to receive a data set and similarity scores. The processor is to execute an eigen response analysis on eigenvectors calculated for a similarity matrix generated based on the similarity scores for the data set. The processor is to output an estimated number of clusters in the data set based on the eigen response analysis.

17 Claims, 8 Drawing Sheets

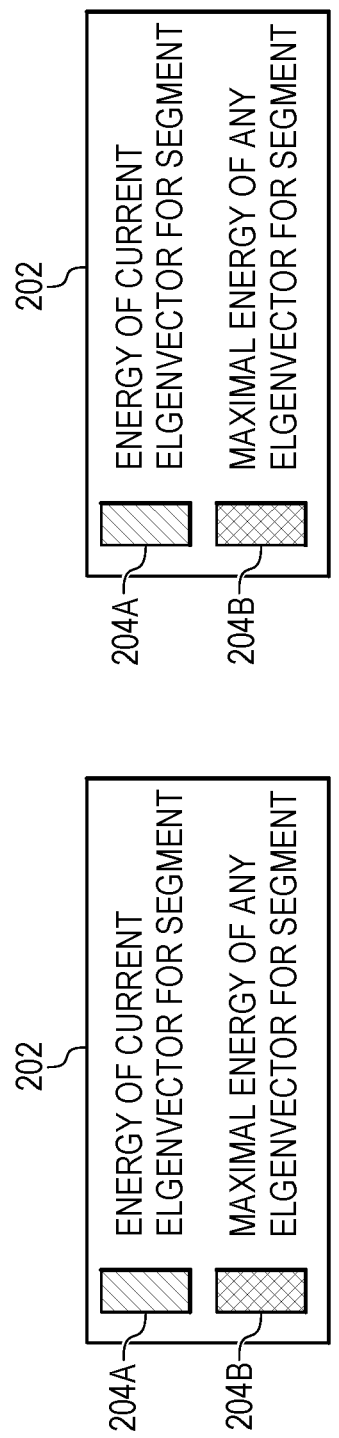
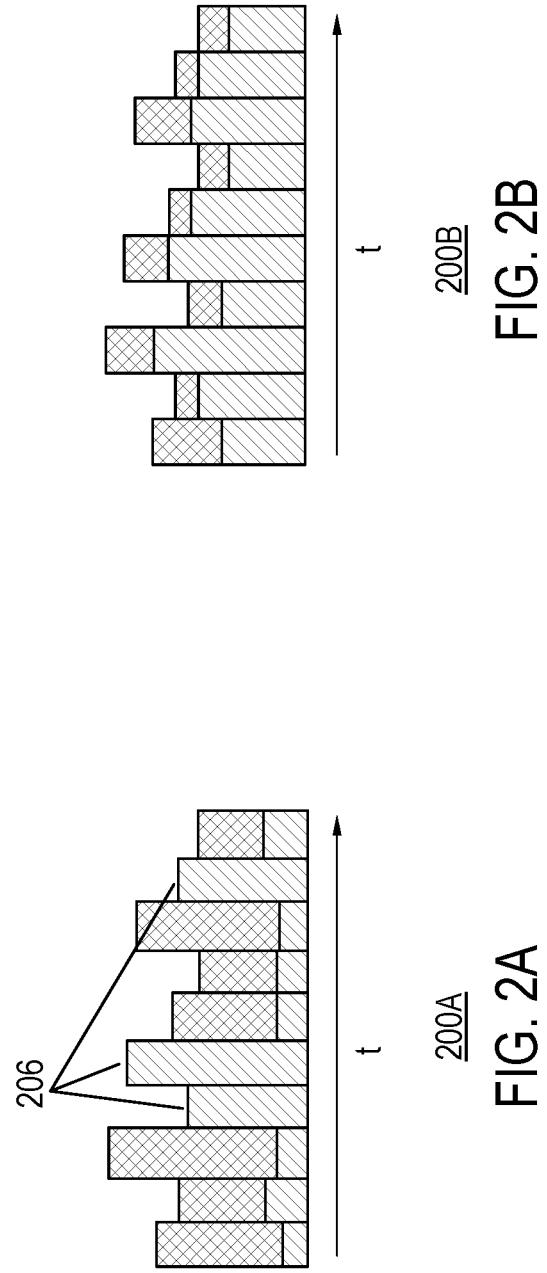
FIG. 2A
FIG. 2B

CALCULATING NUMBERS OF CLUSTERS IN DATA SETS USING EIGEN RESPONSE ANALYSIS

BACKGROUND

The present techniques relate to data clustering. More specifically, the techniques relate to spectral clustering.

SUMMARY

According to an embodiment described herein, a system can include processor to receive a data set and similarity scores. The processor can also further execute an eigen response analysis on eigenvectors calculated for a similarity matrix generated based on the similarity scores for the data set. The processor can also output an estimated number of clusters in the data set based on the eigen response analysis.

According to another embodiment described herein, a method can include receiving, via a processor, a data set and similarity scores. The method can further include executing, via the processor, an eigen response analysis on eigenvectors calculated for a similarity matrix generated based on the similarity scores for the data set. The method can also further include outputting, via the processor, an estimated number of clusters in the data set based on the eigen response analysis.

According to another embodiment described herein, a computer program product for computing numbers of clusters in data can include computer-readable storage medium having program code embodied therewith. The computer readable storage medium is not a transitory signal per se. The program code executable by a processor to cause the processor to receive a data set and similarity scores. The program code can also cause the processor to execute an eigen response analysis on eigenvectors calculated for a similarity matrix generated based on the similarity scores for the data set. The program code can also cause the processor to output an estimated number of clusters in the data set based on the eigen response analysis.

BRIEF DESCRIPTION OF THE SEVERAL VIEWS OF THE DRAWINGS

FIG. 2A is an example bar graph of a temporal response analysis comparing energy of an eigenvector corresponding to a speaker with maximal energy of any eigenvector for segments of data;

FIG. 2B is an example bar graph of a temporal response analysis comparing energy of an eigenvector corresponding to noise with maximal energy of any eigenvector for segments of data;

DETAILED DESCRIPTION

Figure 1:
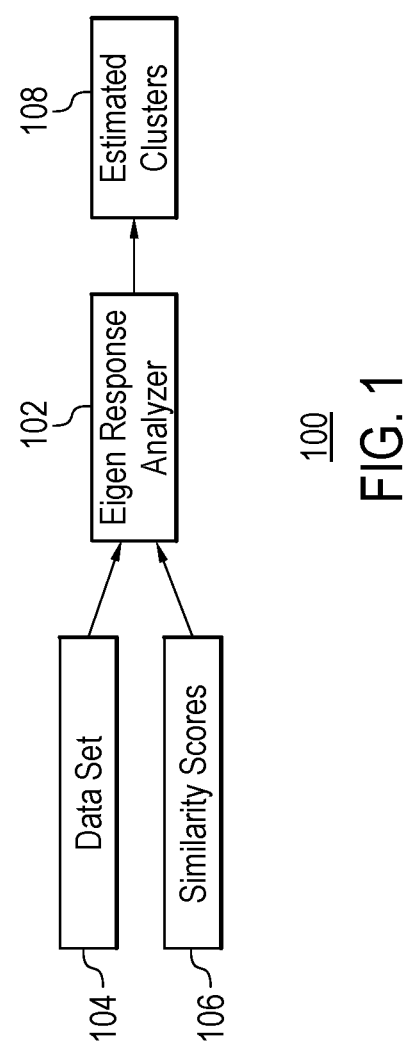
FIG. 1 is a block diagram of an example system for estimating numbers of clusters in data sets.

Clustering is used to separate data sets into a number of groups for a variety of purposes. For example, spectral clustering is a currently used clustering method for tasks such as speaker diarization. Speaker diarization is a process of partitioning an input audio stream into homogeneous segments according to the speaker identity. Speaker diarization can enhance the readability of an automatic speech transcription by structuring the audio stream into speaker turns and, when used together with speaker recognition systems, by providing a speaker's true identity. In particular, speaker diarization may be used to answer the question "who spoke when?" Speaker diarization may include segmenting the audio input into short single-speaker segments and embedding the segments of speech into a space that represents the speaker's characteristics. The segment embeddings may then be clustered to identify which speaker is associated with each of the segments.

A major challenge in spectral clustering is estimating the number of clusters. In particular, spectral clustering calculates eigenvectors of the similarity matrix which need to be distinguished between speaker-indicative eigenvectors and noisy eigenvectors. This is usually done by analyzing the sorted corresponding eigenvalues and looking for some sort of drop in the eigenvalues, also referred to as an eigengap, because the large eigenvalues of the similarity matrix may typically correspond to speakers, and the small eigenvalues may typically correspond to within-speaker variability, which may be considered as noise in the context of speaker identification. The eigengap is the difference between two successive eigenvalues, where eigenvalues are sorted in ascending order. In some examples, a similarity matrix may be computed in which each value of the matrix represents a similarity between some element i and some element j. A principal component analysis may then be applied on the matrix to analyze eigenvalues of the matrix. For example, some approaches may analyze the eigenvalues of the similarity matrix, or some derivative such as the Laplacian, and search for an eigengap. However, determining the right cutoff point may be difficult, as there may be some borderline eigenvalues for which it may be difficult to distinguish between an eigenvalue that corresponds to an actual speaker and one that corresponds to noise.

According to embodiments of the present disclosure, a system includes a processor that can receive a data set and similarity scores. The processor can execute an eigen response analysis on eigenvectors calculated for a similarity matrix generated based on the similarity scores for the data set. The processor can output an estimated number of clusters in the data set based on the eigen response analysis. Thus, embodiments of the present disclosure enable improved calculation of the number of clusters in a dataset. In particular, when tested on speech diarization, the techniques described herein significantly reduced the Diarization Error Rate (DER), which is the fraction of time that is not attributed correctly to a speaker of a number of speakers.

With reference now to FIG. 1, a block diagram shows an example system for estimating the numbers of clusters in data sets. The example system is generally referred to by the reference number 100. FIG. 1 includes an eigen response analyzer 102. The eigen response analyzer 102 is shown receiving data 104 and similarity scores 106. In some examples, the similarity scores may indicate speaker similarity between speech segments. In various examples, the similarity scores may have been calculated using a neural network trained to compute speaker similarity scores between pairs of segments or between pairs of clusters. For example, a pair of acoustic embeddings may be jointly fed into the neural network along with corresponding durations of the segments to generate the similarity scores 106. In various examples, the similarity scores may alternatively indicate similarity between images, patches of images, clients, client data, or any other suitable data segments. The eigen response analyzer 102 is shown outputting an estimated number of clusters 108. For example, in a system 100 used for speaker diarization, the number of clusters 108 may indicate the number of unique speakers in the sample of data 104.

In the example of FIG. 1, the eigen response analyzer 102 may first generate a similarity matrix for the data 104 based on the similarity scores 106. For example, the similarity matrix may include a set of pairwise comparisons between the data segments. For example, the similarity matrix may be an n×n matrix.

In various examples, the eigen response analyzer 102 can compute the eigenvectors and corresponding eigenvalues of the similarity matrix. For example, the eigen response analyzer 102 can compute the eigenvalues of the similarity matrix by finding the roots of the characteristic polynomial. For example, a similarity matrix of n×n may have n-1 eigenvalues and corresponding eigenvectors. The eigen response analyzer 102 can then compute the eigenvectors for each eigenvalue. In some examples, the eigen response analyzer 102 can alternatively compute the eigenvectors first, then compute the eigenvalue corresponding to each eigenvector. For example, the eigen response analyzer 102 can compute the eigenvectors using In some examples, the eigen response analyzer 102 can compute a matrix E of size n×k, where k is the number of eigenvalues. For example, the matrix E may be a matrix stacking a number k of top eigenvectors. As one example, k may be set to a value of 10. Thus, the matrix E may be a matrix of top 10 eigenvectors as ranked based on their corresponding eigenvalues.

The eigen response analyzer 102 can then classify each of the eigenvectors as cluster indicative or as noise. For example, each top eigenvector of the similarity matrix may correspond to one or two speakers. In various examples, the eigen response analyzer 102 can multiply the similarity matrix with this eigenvector to obtain a resulting vector referred to herein as a temporal response vector. Observing the absolute values of the components of the temporal response vector, large values may be found in coordinates corresponding to segments that belong to the speaker associated with the eigenvector. In some examples, the eigen response analyzer 102 can thus generate a response matrix R. For example, R may be generated by multiplying the similarity matrix A by the matrix E.

In the case of two speakers associated to the same eigenvector, one of the speakers may induce large positive values and the other may induce large negative values. Thus, in various examples, eigen response analyzer 102 can separate each set of positive values and negative values of a temporal response vector, referred to herein as positive signed-eigenvector and a negative signed-eigenvector, and separately analyze each of the separated signed-eigenvectors. In case of an eigenvector that is not associated to any speaker, the temporal response may be classified as noisy. In particular, an eigenvalue may be referred to herein as positive-dominant in segment j if the eigenvector has a positive projection on row j of the similarity matrix and the magnitude of the projection is maximal with respect to the magnitudes of the projections of other eigenvalues on row j. Similarly, an eigenvalue may be referred to herein as negative-dominant in segment j if the eigenvector has a negative projection on row j of the similarity matrix and the magnitude of the projection is maximal with respect to the magnitudes of the projections of other eigenvalues on row j. In various examples, for every speaker in the session, there may exist an eigenvalue that is either positive-dominant or negative-dominant in all the rows that correspond to the speaker.

In some examples, for every segment in the sample of data 104, the eigen response analyzer 102 can find an eigenvector that has the largest absolute response. The largest absolute response for a particular data element i in the most responding eigenvector is referred to herein as a win. In response to detecting a win, the eigen response analyzer 102 can increase a win counter for each signed-eigenvector, which may be a positive signed-eigenvector or a negative signed-eigenvector as described above. The eigen response analyzer 102 can then compare these counters to a threshold and remove any signed-eigenvectors that do not have a number of wins that exceed a threshold. For example, the threshold may be a predetermined number. In some examples, the threshold may be tuned automatically on a labeled development data set.

In some examples, the eigen response analyzer 102 may be implemented using a trained neural network. For example, the input into the trained neural network may be a response vector and the output may be the number of clusters corresponding to that response vector. For example, the number of clusters output for the response vector may be 0, 1 or 2. During training of the neural network on labeled data, the true number of clusters is known, For example, the true number of clusters used as ground truth data for training may be the number of speakers in a given recording. Therefore for each response vector, the number of speakers may be used as ground truth as to whether the response vector corresponds to a cluster-eigenvector or noise-eigenvector.

Still referring to FIG. 1, the eigen response analyzer 102 can output a number of clusters. For example, the number of clusters 108 may be the number of signed-eigenvectors remaining, or the number of signed-eigenvectors that include a number of wins that exceed the threshold.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.). In various examples, other types of data sets may be processed using system 100. For example, if given a set of N images, each containing an image of a face, the N images may be clustered into k persons, where k is unknown. In some examples, a given N gene expressions may be clustered into k genes, where. k is unknown.

FIG. 2A is an example bar graph 200A of a temporal response analysis comparing energy of an eigenvector corresponding to a speaker indicative response with maximal energy of any eigenvector for segments of data. As shown in legend 202, the single line shaded bars represent energy 204A of current eigenvector for a segment. For example, the energy 204A may be the absolute value of the projection of an eigenvector associated with a particular cluster onto the similarity matrix data segments. In various examples, as described herein, eigenvectors may have been separated into signed-eigenvectors based on their response vectors. Thus, in some examples, the energy 204A may be the absolute value of the projection of a signed-eigenvector, which may be a positive signed-eigenvector or a negative signed-eigenvector. The legend 202 also indicates that maximal energy 204B is represented by cross hatched bars. The maximal energy 204B at each of the segments may be the maximum absolute value of the projection of all the eigenvectors onto the similarity matrix. The bars corresponding to the energy 204A are overlaid on top of the bars of the maximal energy 204B to enable a per segment comparison. The bars of the bar graph 200A represent discrete segments of time. For example, a data set may have been split into segments based on time. As one example, each bar may represent a second of time.

In the example of FIG. 2A, a threshold may have been set to two wins in order to detect a speaker indicative eigenvector in a temporal response analysis. As shown in FIG. 2A, three wins 206 are shown. For example, in each win, the energy 204A of the current eigenvector matches the maximal energy 204B of any eigenvector for three segments corresponding to wins 206 in the bar chart 200A. Thus, in the example of speaker diarization, a speaker count may be incremented by one based on the total wins counted for the eigenvector exceeding the threshold of two wins.

It is to be understood that the block diagram of FIG. 2A is not intended to indicate that the bar graph 200A is to include all of the components shown in FIG. 2A. Rather, the bar graph 200A can include fewer or additional components not illustrated in FIG. 2A (e.g., segments, or additional overlaid bars, etc.). In some examples, the time domain axis may be replaced with another domain based on the data being processed.

FIG. 2B is an example bar graph of a temporal response analysis comparing energy of an eigenvector corresponding to a noisy response with maximal energy of any eigenvector for segments of data. FIG. 2B includes similarly referenced elements of FIG. 2A. For example, the values of the maximal energy 204B are the same as the values in FIG. 2A. However, the single line shaded bars represent a different current eigenvector from the eigenvector being analyzed in bar graph 200A, and therefore the values of energy 204A in FIG. 2B differ from FIG. 2A.

In the example of FIG. 2B, although the energy 204A is quite high across the different segments, indicative of a larger average of the eigenvalues, the bar graph 200B does not include any wins in which the energy 204A of the current eigenvector matches the maximal energy 204B of all the eigenvectors. Thus, the current eigenvector analyzed in FIG. 2B may be classified as noise, instead of belonging to a cluster representing a speaker.

It is to be understood that the block diagram of FIG. 2B is not intended to indicate that the bar graph 200B is to include all of the components shown in FIG. 2B. Rather, the bar graph 200B can include fewer or additional components not illustrated in FIG. 2B (e.g., segments, or additional overlaid bars, etc.).

Figure 3:
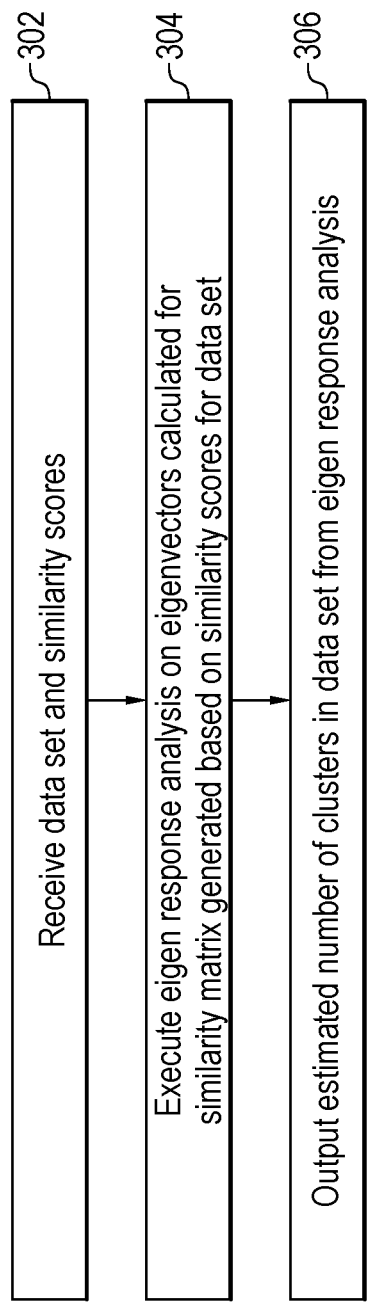
FIG. 3 is a process flow diagram of an example method that can estimate numbers of clusters in data sets.

FIG. 3 is a process flow diagram of an example method that can estimate numbers of clusters in data sets. The method 300 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8, respectively.

At block 302, a processor receives a data set and similarity scores. For example, the similarity scores may be calculated between pairs of data elements. Each similarity score may be a similarity between two segments of a data set. As one examples, the similarity scores may be computed using the dot product between corresponding feature embeddings of the data elements. In another example, the similarity scores may be calculated using a neural network that receives as input two segments of data and outputs a similarity score ranging from 0 to 1, where 1 indicates high similarity and zero indicates no similarity.

At block 304, the processor executes an eigen response analysis on eigenvectors calculated for a similarity matrix generated based on the similarity scores for the data set. For example, the eigen response analysis may include calculating response vectors by projection of the eigenvectors onto the similarity matrix, associating positive responses with positive signed-eigenvectors and negative responses with negative signed-eigenvectors, and counting wins for each of the signed-eigenvectors based on the responses exceeding the responses of other eigenvectors. In some examples, the eigen response analysis may include calculating the response vectors by projection of the eigenvectors onto the similarity matrix and inputting the response vectors into a trained neural network.

At block 306, the processor outputs an estimated number of clusters in the data set based on the eigen response analysis. In some examples, the processor may receive an estimated number of clients from the neural network and output the estimated number of clusters.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
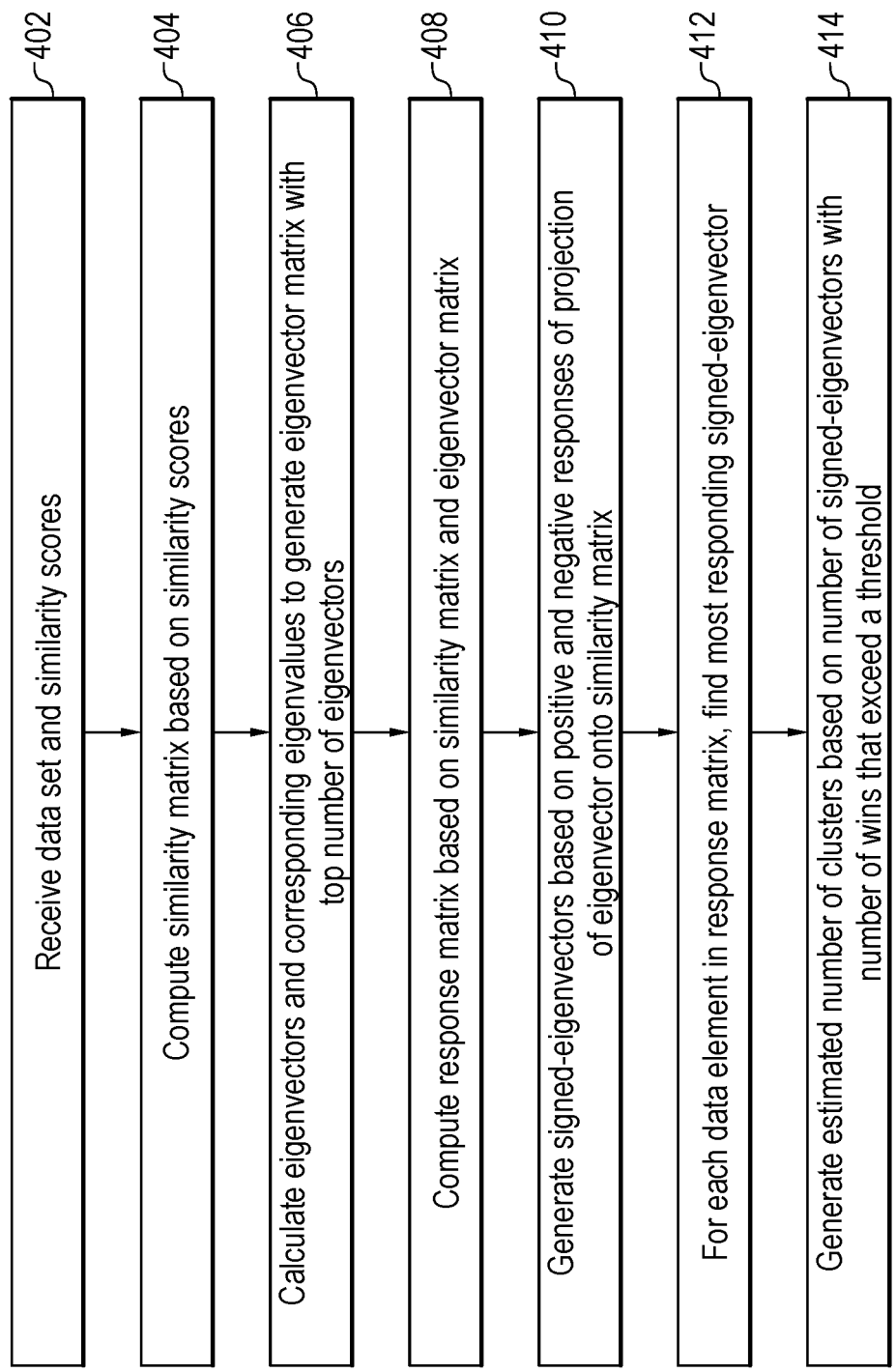
FIG. 4 is a process flow diagram of an example method that can estimate numbers of clusters in data sets using a comparison of wins per data segment.

FIG. 4 is a process flow diagram of an example method that can estimate numbers of clusters in data sets using a comparison of wins per data segment. The method 400 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8, respectively.

At block 402, a processor receives a data set and similarity scores. For example, the similarity scores may be calculated between pairs of data elements. In various examples, the similarity scores may be calculated using a dot product. In some examples, the similarity scores may be calculated using a trained neural network.

At block 404, the processor computes the similarity matrix based on the similarity scores. For example, the similarity matrix may include similarity scores corresponding to a pairwise comparison of data segments in the data set.

At block 406, the processor calculates the eigenvectors and corresponding eigenvalues to generate an eigenvector matrix of a predetermined number of eigenvectors with corresponding eigenvalues that are higher than other eigenvectors of the calculated eigenvectors. For example, the processor can generate an eigenvector matrix of a top number of eigenvectors ranked based on corresponding eigenvalues.

At block 408, the processor computes a response matrix based on the similarity matrix and a calculated eigenvector matrix. For example, the response matrix may be a projection of the eigenvector matrix onto the similarity matrix. In various examples, each of the eigenvectors may thus be associated with a response vector.

At block 410, generate positive and negative signed-eigenvectors based on positive and negative responses of a projection of an eigenvector onto the similarity matrix. For example, each positive signed-eigenvector may be associated with positive values of a response vector and the negative signed-eigenvector may be associated with negative responses in the response vector. The positives values in the projection thus belong to the positive signed-eigenvector, and the negative values belong to the negative signed-eigenvector.

At block 412, for each data element in the response matrix, the processor finds a most responding signed-eigenvector. For example, the processor may detect a win in response to detecting that a signed-eigenvector of the eigenvectors is associated with a response to a data element in a response matrix that is greater than the responses associated with other signed-eigenvectors. Thus, as one example, if an eigenvector has a projection resulting four wins, with three of the wins having a large positive value and one win with a large negative value, then the processor may count three wins for the positive signed-eigenvector and one win for the negative signed-eigenvector.

At block 414, the processor generates an estimated number of clusters based on a number of signed-eigenvectors and eigenvectors with a number of wins exceeding a threshold. For example, each signed-eigenvector with a number of wins exceeding a threshold may correspond to a unique cluster. As one example, if the threshold is set to two, then the positive signed-eigenvector with three wins may count as a cluster and the negative-signed eigenvector associated with one win may not be counted as a cluster. In various examples, the number of clusters may correspond to a number of speakers, clients, or other data generators.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
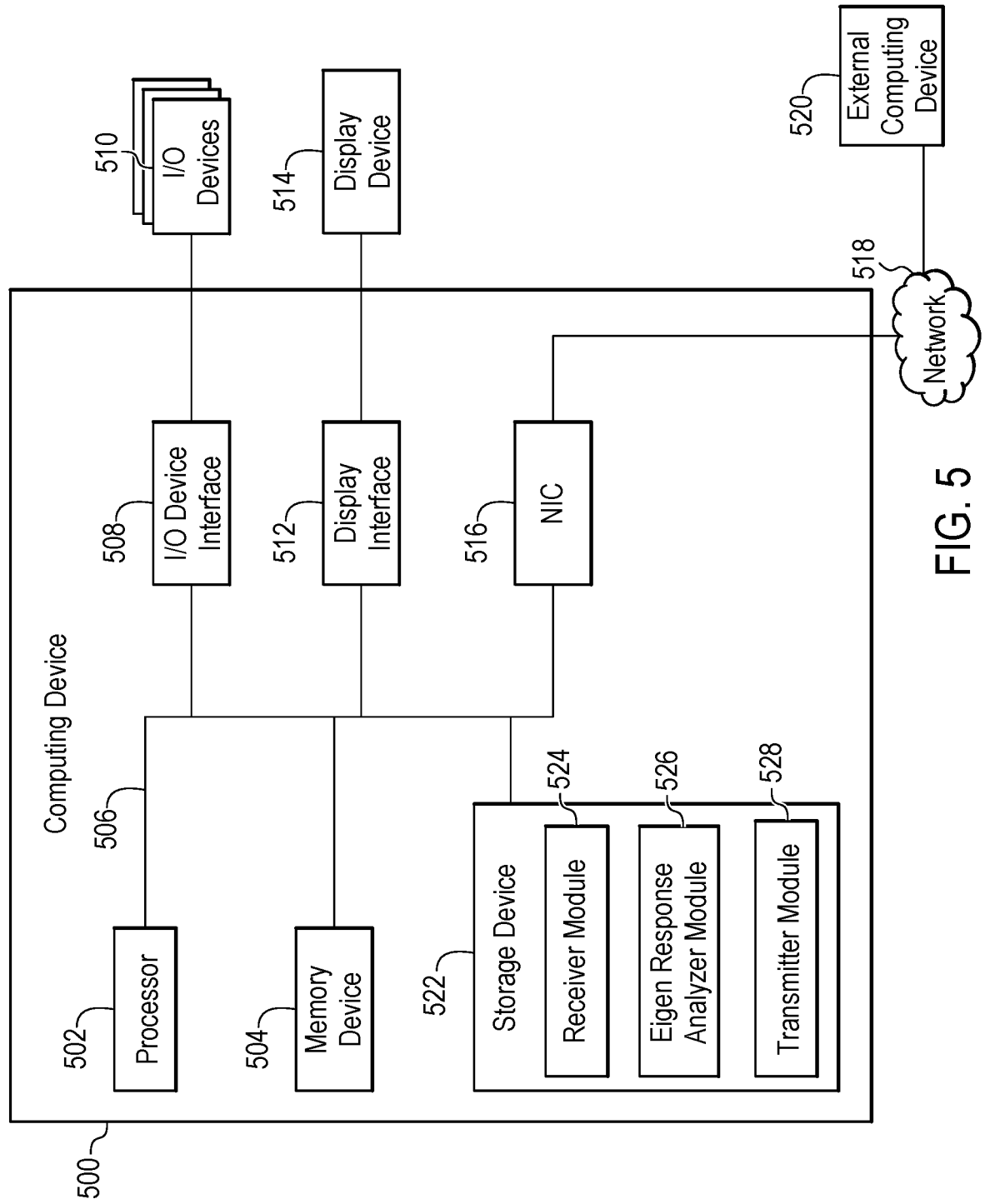
FIG. 5 is a block diagram of an example computing device that can estimate numbers of clusters in data sets.

FIG. 5 is block diagram of an example computing device that can estimate numbers of clusters in data sets. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, an eigen response module 526, and a transmitter module 528. The receiver module 524 can receive a data set and similarity scores. For example, the data set may be segmented speech data. In some examples, the similarity scores may be received from a neural network. The eigen response module 526 can execute an eigen response analysis on eigenvectors calculated for a similarity matrix generated based on the similarity scores for the data set. For example, the eigen response analysis may include a comparison of eigenvector projections onto a similarity matrix computed based on the similarity scores. In some examples, the eigen response module 526 can generate an eigenvector matrix of top eigenvectors sorted based on corresponding eigenvalues. In various examples, the eigen response module 526 can separate positive and negative responses of a projection of an eigenvector to generate two signed-eigenvectors. For example, each of the two-signed eigenvectors may then be separately analyzed for wins with respect to the data set. In various examples, the eigen response module 526 can detect a win for an eigenvector with respect to each segment of the data set in response to detecting that an energy of the eigenvector for the segment matches the maximal energy of all the eigenvectors in the eigenvector matrix. For examples, the energy may be an absolute value of the projection of an eigenvector onto the similarity matrix. In some examples, the response module 526 can detect an eigenvector as indicative of a separate cluster in response to detecting that a number of detected wins for the eigenvector in the data set exceeds a threshold. In some examples, the response module 526 can detect an eigenvector as indicative of noise in response to detecting that a number of detected wins in the data set does not exceed a threshold. In some examples, estimate a number of speakers in the data set based on the number of detected clusters. In some examples, the eigen response analysis is executed by a neural network trained to receive the response vectors and output a number of clusters. For example, the response vectors may be calculated by projecting the eigenvectors onto the similarity matrix. The transmitter module 528 can output an estimated number of clusters in the data set based on the eigen response analysis. In some examples, the transmitter module 528 can output an estimated number of speakers based on the estimated number of clusters.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver module 524, the eigen response module 526, and the transmitter module 528 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, eigen response module 526, and transmitter module 528 can be implemented with logic, wherein the logic, as referred to herein, can include any suitable hardware (e.g., a processor, among others), software (e.g., an application, among others), firmware, or any suitable combination of hardware, software, and firmware.

Figure 6:
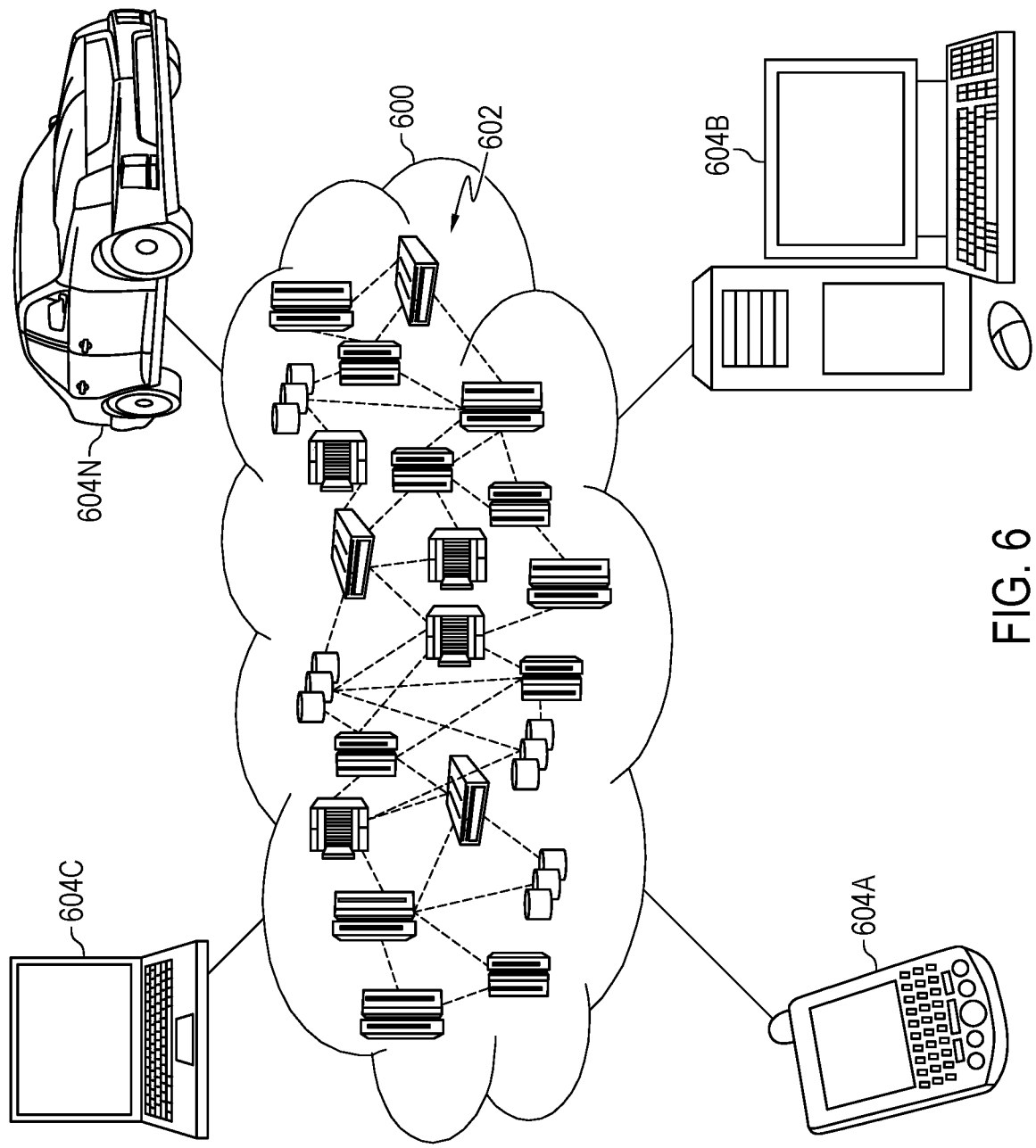
FIG. 6 is a diagram of an example cloud computing environment according to embodiments described herein.

Referring now to FIG. 6, illustrative cloud computing environment 600 is depicted. As shown, cloud computing environment 600 includes one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
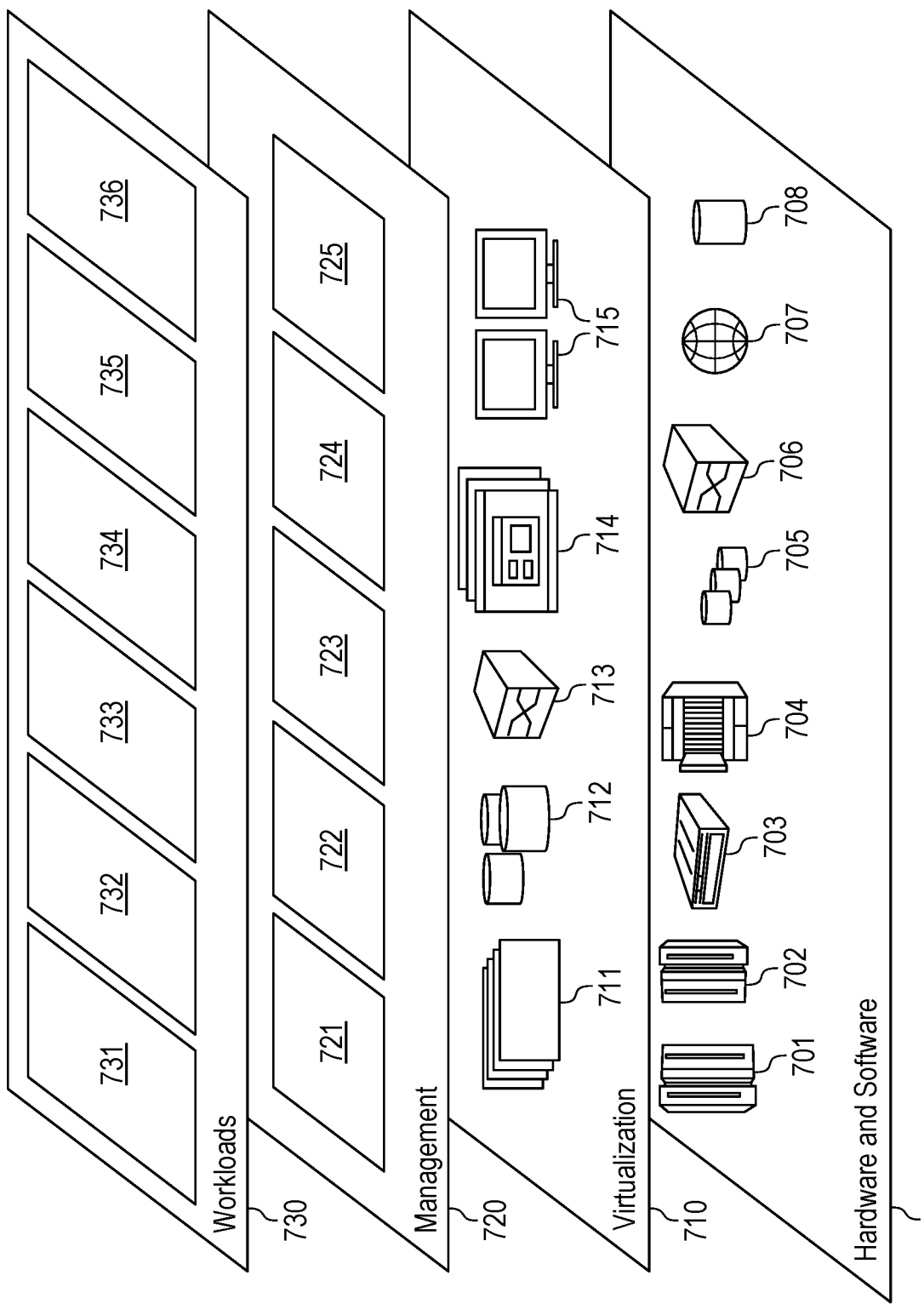
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 701; RISC (Reduced Instruction Set Computer) architecture based servers 702; servers 703; blade servers 704; storage devices 705; and networks and networking components 706. In some embodiments, software components include network application server software 707 and database software 708.

Virtualization layer 710 provides an abstraction layer from which the following examples of virtual entities may be provided: virtual servers 711; virtual storage 712; virtual networks 713, including virtual private networks; virtual applications and operating systems 714; and virtual clients 715.

In one example, management layer 720 may provide the functions described below. Resource provisioning 721 provides dynamic procurement of computing resources and other resources that are utilized to perform tasks within the cloud computing environment. Metering and Pricing 722 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 723 provides access to the cloud computing environment for consumers and system administrators. Service level management 724 provides cloud computing resource allocation and management such that required service levels are met. Service Level Agreement (SLA) planning and fulfillment 725 provide pre-arrangement for, and procurement of, cloud computing resources for which a future requirement is anticipated in accordance with an SLA.

Workloads layer 730 provides examples of functionality for which the cloud computing environment may be utilized. Examples of workloads and functions which may be provided from this layer include: mapping and navigation 731; software development and lifecycle management 732; virtual classroom education delivery 733; data analytics processing 734; transaction processing 735; and cluster estimation 736.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
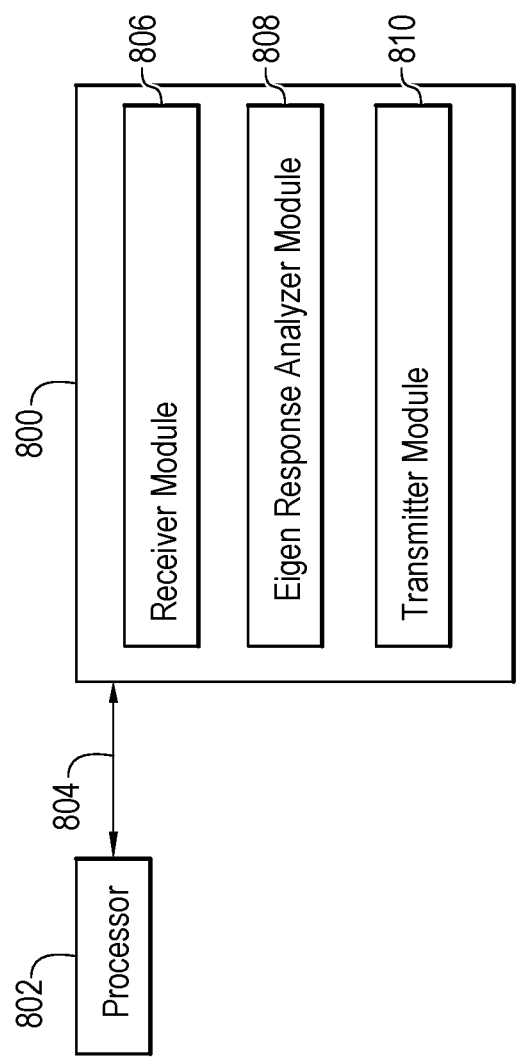
FIG. 8 is an example tangible, non-transitory computer-readable medium that can estimate numbers of clusters in data sets.

Referring now to FIG. 8, a block diagram is depicted of an example tangible, non-transitory computer-readable medium 800 that can estimate numbers of clusters in data sets. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 300 and 400 of FIGS. 3 and 4.

The various software components discussed herein may be stored on the tangible, non-transitory, computer-readable medium 800, as indicated in FIG. 8. For example, a receiver module 806 includes code to receive a data set and similarity scores. An eigen response analyzer module 808 includes code to execute an eigen response analysis on eigenvectors calculated for a similarity matrix generated based on the similarity scores for the data set. The eigen response analyzer module 808 further includes code to compute the similarity matrix based on the similarity scores. The eigen response analyzer module 808 also includes code to calculate the eigenvectors and corresponding eigenvalues to generate an eigenvector matrix of a predetermined number of eigenvectors with corresponding eigenvalues that are higher than other eigenvectors of the calculated eigenvectors. In some examples, the eigen response analyzer module 808 also includes code to compute a response matrix based on the similarity matrix and a calculated eigenvector matrix. For example, the response matrix may be a projection of the eigenvector matrix onto the similarity matrix. In some examples, the eigen response analyzer module 808 includes code to generate positive and negative signed-eigenvectors based on positive and negative responses of a projection of an eigenvector onto the similarity matrix. In various examples, the eigen response analyzer module 808 also includes code to detect a win in response to detecting that a signed-eigenvector of the eigenvectors has a larger response to each data element in a response matrix than other eigenvectors. For example, the estimated number of clusters may be generated based on a number of signed-eigenvectors and eigenvectors with a number of wins exceeding a threshold. In some examples, the eigen response analyzer module 808 includes code to input the response matrix into a trained neural network and receive an estimated number of clusters from the trained neural network. A transmitter module 810 includes code to output an estimated number of clusters in the data set based on the eigen response analysis. The transmitter module 810 also includes code to output an estimated number of speakers.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive a data set and similarity scores;
   execute an eigen response analysis on eigenvectors calculated for a similarity matrix generated based on the similarity scores for the data set, wherein the eigenvectors are multiplied by the similarity matrix to generate temporal response vectors;

input the generated temporal response vectors into a trained neural network, wherein the trained neural network is trained to generate an estimated number of clusters in the data set based on a number of signed-eigenvectors associated with responses having a number of wins exceeding a threshold using labeled data comprising a true number of clusters for each response vector used in training; and receive, from the trained neural network, an output estimated number of clusters associated with each of the temporal response vectors.

2. The system of claim 1, wherein the eigen response analysis comprises a comparison of eigenvector projections onto the similarity matrix computed based on the similarity scores.

3. The system of claim 1, wherein the processor is to detect a win for an eigenvector of the eigenvectors with respect to each segment of the data set in response to detecting that an energy of the eigenvector for the segment matches a maximal energy of all the eigenvectors in an eigenvector matrix, wherein the energy comprises an absolute value of a projection of the eigenvector onto the similarity matrix.

4. The system of claim 3, wherein the processor is to detect the eigenvector as indicative of noise in response to detecting that a number of detected wins in the data set does not exceed the threshold.

5. The system of claim 1, wherein the processor is to separate positive and negative responses of a projection of an eigenvector of the eigenvectors to generate two signed-eigenvectors, wherein each of the two signed-eigenvectors are separately analyzed for wins with respect to the data set.

6. The system of claim 1, wherein the data set comprises segmented speech data, and the processor is to estimate a number of speakers in the data set based on a number of detected clusters.

7. A computer-implemented method, comprising:
receiving, via a processor, a data set and similarity scores;
executing, via the processor, an eigen response analysis on eigenvectors calculated for a similarity matrix generated based on the similarity scores for the data set, wherein the eigenvectors are multiplied by the similarity matrix to generate temporal response vectors;
inputting, via the processor, the generated temporal response vectors into a trained neural network, wherein the trained neural network is trained to generate an estimated number of clusters in the data set based on a number of signed-eigenvectors associated with responses having a number of wins exceeding a threshold using labeled data comprising a true number of clusters for each response vector used in training; and
receive, from the trained neural network, an output estimated number of clusters associated with each of the temporal response vectors.

8. The computer-implemented method of claim 7, comprising calculating, via the processor, the eigenvectors and corresponding eigenvalues to generate an eigenvector matrix of a predetermined number of eigenvectors with corresponding eigenvalues that are higher than other eigenvectors of the calculated eigenvectors.

9. The computer-implemented method of claim 7, comprising computing, via the processor, a response matrix based on the similarity matrix and a calculated eigenvector matrix, wherein the response matrix comprises a projection of the eigenvector matrix onto the similarity matrix.

10. The computer-implemented method of claim 7, comprising generating, via the processor, positive and negative signed-eigenvectors based on positive and negative responses of a projection of an eigenvector of the eigenvectors onto the similarity matrix.

11. The computer-implemented method of claim 7, comprising detecting, via the processor, a win in response to detecting that an eigenvector of the eigenvectors has a larger response to each data element in a response matrix than other eigenvectors.

12. A computer program product for computing numbers of clusters in data, the computer program product comprising a computer-readable storage medium having program code embodied therewith, the program code executable by a processor to cause the processor to:
receive a data set and similarity scores;
execute an eigen response analysis on eigenvectors calculated for a similarity matrix generated based on the similarity scores for the data set;
input the generated temporal response vectors into a trained neural network, wherein the trained neural network is trained to generate an estimated number of clusters in the data set based on a number of signed-eigenvectors associated with responses having a number of wins exceeding a threshold using labeled data comprising a true number of clusters for each response vector used in training; and
receive, from the trained neural network, an output estimated number of clusters associated with each of the temporal response vectors.

13. The computer program product of claim 12, further comprising program code executable by the processor to compute the similarity matrix based on the similarity scores.

14. The computer program product of claim 12, further comprising program code executable by the processor to calculate the eigenvectors and corresponding eigenvalues to generate an eigenvector matrix of a predetermined number of eigenvectors with corresponding eigenvalues that are higher than other eigenvectors of the calculated eigenvectors.

15. The computer program product of claim 12, further comprising program code executable by the processor to compute a response matrix based on the similarity matrix and a calculated eigenvector matrix, wherein the response matrix comprises a projection of the eigenvector matrix onto the similarity matrix.

16. The computer program product of claim 12, further comprising program code executable by the processor to generate positive and negative signed-eigenvectors based on positive and negative responses of a projection of an eigenvector onto the similarity matrix.

17. The computer program product of claim 12, further comprising program code executable by the processor to detect a win in response to detecting that a signed-eigenvector of the eigenvectors has a larger response to each data element in a response matrix than other eigenvectors.

* * * * *